(12) United States Patent
Martino

(10) Patent No.: US 6,851,274 B2
(45) Date of Patent: Feb. 8, 2005

(54) PORTABLE FOOD CONTAINER WITH COOLING DEVICE

(76) Inventor: Leandro Patricio Martino, 50 Harbor Point Blvd., Apt. 104, Dorchester, MA (US) 02125

( * ) Notice: Subject to any disclaimer, the term of this patent is extended or adjusted under 35 U.S.C. 154(b) by 0 days.

(21) Appl. No.: 10/250,087

(22) Filed: Jun. 3, 2003

(65) Prior Publication Data

US 2004/0244404 A1 Dec. 9, 2004

(51) Int. Cl.[7] ................................................ F25D 3/08
(52) U.S. Cl. ......................... 62/457.1; 62/371; 62/530
(58) Field of Search ............................ 62/457.1, 457.2, 62/371, 530

(56) References Cited

U.S. PATENT DOCUMENTS

| | | | | |
|---|---|---|---|---|
| 4,499,998 A | * | 2/1985 | Carlson ....................... 206/541 |
| 5,570,588 A | * | 11/1996 | Lowe ......................... 62/457.7 |
| 5,701,757 A | * | 12/1997 | Heverly ...................... 62/457.2 |
| 5,711,164 A | * | 1/1998 | Slack .......................... 62/457.9 |
| 6,029,457 A | * | 2/2000 | Neeser et al. ................. 62/46.1 |
| 6,145,333 A | * | 11/2000 | Richmond et al. ............. 62/258 |

* cited by examiner

Primary Examiner—Melvin Jones

(57) ABSTRACT

A portable food container which includes a cooling device capable of keeping the food cool and fresh for several hours. Apparatus consist of three parts: a flat plastic cover removable from the main compartment; a main compartment consisting of a plastic container designed to place food inside it; and a cooling device consisting of a small plastic container completely sealed and filled with freezable gel that remains cold for several hours. The apparatus is designated to be placed on the bottom of a fridge until the freezable gel contained in the sealed cooling device is frozen. Afterwards, the user can place food inside the main compartment, close it with the cover and carry the apparatus with him/her for later consumption of fresh food. The apparatus can be carried inside a purse, briefcase, backpack, etc.

5 Claims, 2 Drawing Sheets

PORTABLE FOOD CONTAINER WITH COOLING DEVICE

BRIEF DESCRIPTION OF DRAWINGS

The invention will be better understood after a study of the following detailed description thereof. Such description makes reference to the annexed drawing wherein.

DETAILED DESCRIPTION

Figure 1:
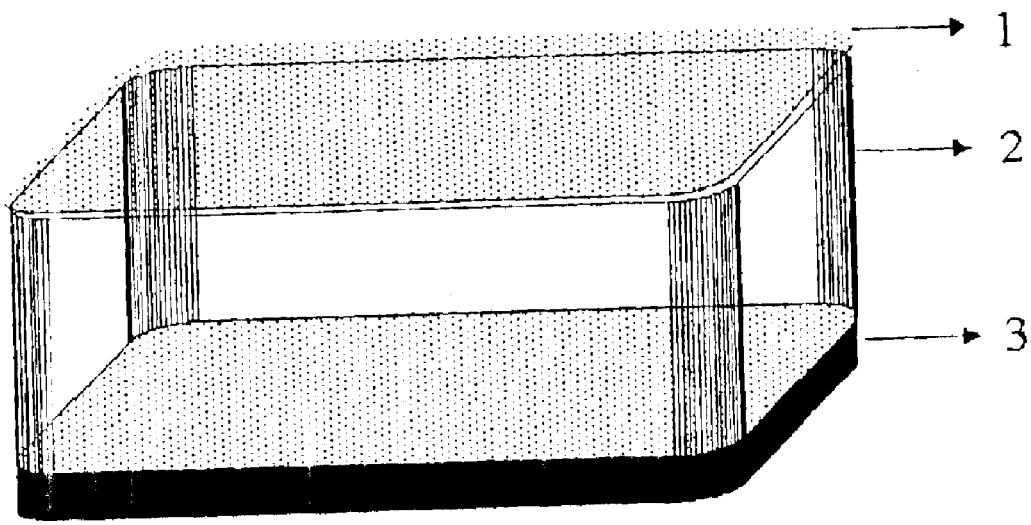
FIG. 1 is a perspective view of the portable apparatus according to the present invention.
Figure 2:
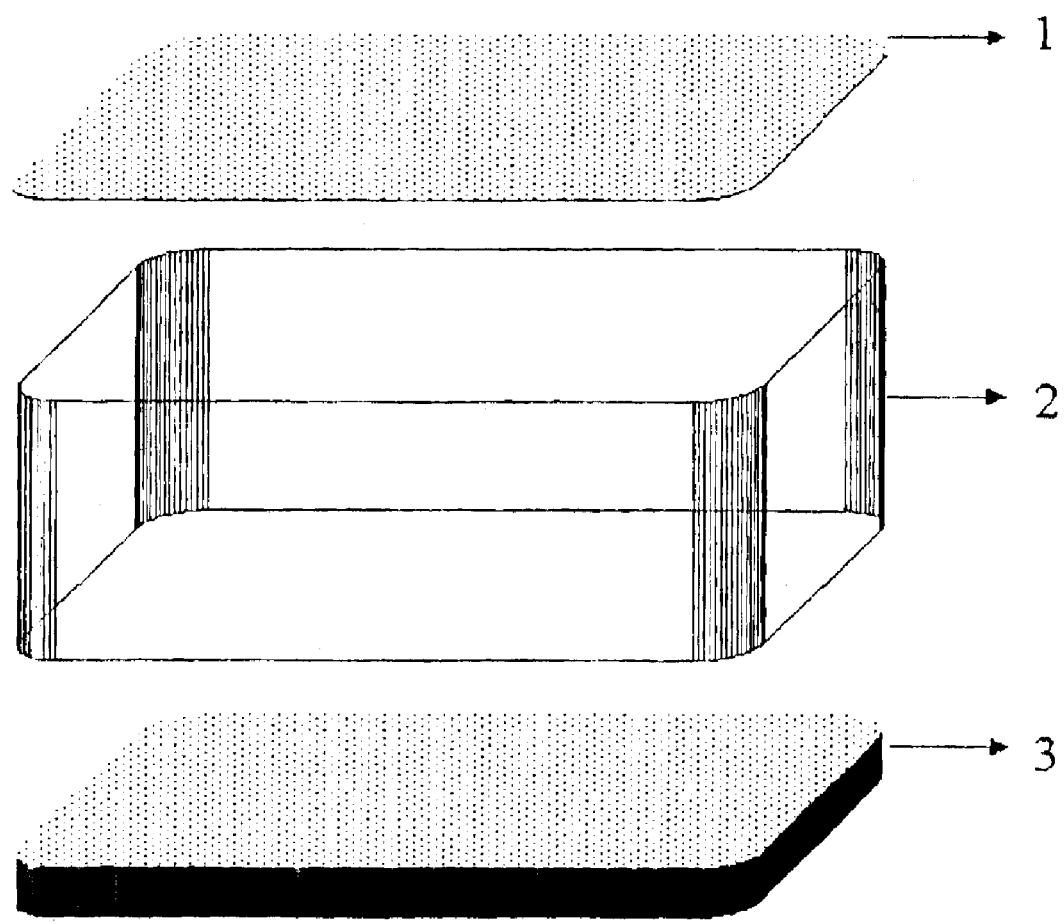
FIG. 2 is an exploded perspective view of the portable apparatus shown in FIG. 1.

The present invention relates to a portable food container which includes a cooling device capable of keeping food cool and fresh for several hours. The apparatus can be easily carried inside a purse, briefcase, backpack, etc. for later consumption of the food.

The invention will be better understood after a study of the following detailed description thereof.

The operation of the portable apparatus will be described. A numeral 1 designates the cover of the apparatus: a flat plastic cover removable from the main compartment. The plastic cover keeps the main compartment sealed when closed and can be removed to place or take out food.

A numeral 2 designates the main compartment of the apparatus: a plastic container designed to place food inside it. The main compartment does neither have top nor bottom it only has side walls. The upper part of the main compartment can be closed with the removable cover designated with numeral 1 and described above. The lower part of the main compartment edges with the cooling device described bellow (designated with numeral 3) and is permanently attached to it.

A numeral 3 designates the cooling device of the apparatus: a small plastic container completely sealed and filled with freezable gel that remains cold for several hours. The upper part of this sealed small container edges with the main compartment described above with numeral 2, and is permanently attached to it. This small plastic container —or cooling device— has the same width and depth than the main compartment, but only a fraction of its height.

The apparatus is designated to be placed on the bottom of a fridge until the freezable gel contained in the sealed cooling device (designated with numeral 3) is frozen. Afterwards, the user can place food inside the main compartment (designated with numeral 2), close it with the cover (designated with numeral 3) and carry the apparatus with him/her for later consumption of fresh food. The apparatus will keep the food cool and fresh during several hours.

I claim:

1. A portable food container which includes a cooling device capable of keeping food cool and fresh for several hours, comprising:

a flat plastic cover removable from the main compartment
    a main compartment consisting of a plastic container designed to place food inside it, and
    a cooling device consisting of a small plastic container completely sealed and filled with a freezable gel that remains cold for several hours.

2. The flat plastic cover described in claim 1, wherein the said cover keeps the main compartment sealed when closed and can be removed to place or take out food.

3. The main compartment mentioned in claim 1, wherein the upper part of the said main compartment can be closed with the removable cover described in claim 1.

4. The cooling device mentioned in claim 1, wherein the upper part of this sealed small container edges with the main compartment described in claim 1 and is permanently attached to it.

5. The cooling device mentioned in claim 1, wherein the said cooling device has the same width and depth than the main compartment mentioned in claim 1, but has only a fraction of its height.

* * * * *